United States Patent
Fladhammer (10) Patent No.: US 7,118,259 B2
(45) Date of Patent: Oct. 10, 2006

(54) ADJUSTER AND ADJUSTER ASSEMBLY

(75) Inventor: Scott Fladhammer, Kenosha, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 181 days.

(21) Appl. No.: 10/753,086

(22) Filed: Jan. 7, 2004

(65) Prior Publication Data

US 2005/0145050 A1   Jul. 7, 2005

(51) Int. Cl.
*F21V 21/30* (2006.01)

(52) U.S. Cl. ............... 362/515; 362/460; 362/507; 362/514; 362/524; 362/528; 362/270; 362/273; 362/282; 362/421; 362/428

(58) Field of Classification Search ............ 362/515, 362/460, 507, 514, 524, 528, 529, 530, 270, 362/273, 282, 285, 324, 421, 428; 74/318, 74/89.23, 424.71, 25
See application file for complete search history.

(56) References Cited

U.S. PATENT DOCUMENTS

| | | | |
|---|---|---|---|
| 4,574,334 A | 3/1986 | Igura | |
| 4,930,367 A | 6/1990 | Nagasawa | |
| 4,939,945 A | 7/1990 | Ryder et al. | |
| 5,003,436 A | 3/1991 | Yamada et al. | |
| 5,077,642 A * | 12/1991 | Lisak | 362/463 |
| 5,079,676 A | 1/1992 | Lisak | |
| 5,163,746 A | 11/1992 | Lisak | |
| 5,165,775 A * | 11/1992 | Lisak et al. | 362/524 |
| 5,214,971 A | 6/1993 | Burton et al. | |
| 5,309,780 A * | 5/1994 | Schmitt | 74/89.13 |
| 5,355,287 A | 10/1994 | Denley | |
| 5,365,415 A | 11/1994 | Schmitt et al. | |
| 5,381,317 A | 1/1995 | Schmitt et al. | |
| 5,444,603 A | 8/1995 | Otsuka et al. | |
| 5,508,896 A | 4/1996 | Suehiro et al. | |
| 5,546,283 A | 8/1996 | Ohtsuka et al. | |
| 5,647,659 A | 7/1997 | Mori | |
| 5,697,692 A | 12/1997 | Hoffman et al. | |
| 5,707,133 A | 1/1998 | Burton | |
| 5,707,134 A | 1/1998 | Nishizawa | |
| 5,741,059 A | 4/1998 | Kusagaya | |
| 5,746,559 A | 5/1998 | Shirai | |
| 5,775,795 A | 7/1998 | Christian et al. | |
| 5,951,157 A | 9/1999 | Shirai et al. | |
| 6,161,950 A | 12/2000 | Tsukamoto et al. | |
| 6,231,223 B1 | 5/2001 | Zucar et al. | |
| 6,260,993 B1 | 7/2001 | Ito | |
| 6,290,379 B1 | 9/2001 | Iwasaki et al. | |
| 6,773,153 B1 * | 8/2004 | Burton | 362/528 |

FOREIGN PATENT DOCUMENTS

EP       0 759 377      6/1996

* cited by examiner

*Primary Examiner*—Sharon Payne
(74) *Attorney, Agent, or Firm*—Brian G. Gilpin; Godfrey & Kahn, S.C.

(57) ABSTRACT

An adjuster having a housing or lamp housing with an adjuster portion, a gear positioned inside the housing or adjuster portion, a control rod engaged to the gear and extending from the housing or adjuster portion, and at least one tang outside the housing or adjuster portion such that the tang engages the control rod and prevents rotation thereof. As such, rotation of the gear results in linear movement of the control rod. The adjuster may be positioned on a lamp housing, or other structure.

28 Claims, 9 Drawing Sheets

ADJUSTER AND ADJUSTER ASSEMBLY

BACKGROUND OF THE INVENTION

This invention relates generally to an adjuster and adjuster assembly, and in particular to an adjuster and adjuster assembly for use in connection with vehicle lamps.

Vehicles such as automobiles typically have several lamps including headlamps and fog lamps. These lamps generally include a housing sealed to a lens with a reflector and bulb therein. The reflector is usually pivotally engaged to the lamp housing at a plurality of points. The lamp housing is attached to the vehicle. Once the lamp assembly has been formed and installed into a vehicle, the aim of the lamp must be adjusted to comply with federal and state regulations. As a result of accidents, maintenance, and normal wear, often the aim of the lamp must be adjusted during the lifetime of the vehicle.

One method of adjusting the aim of the lamp involves using an adjuster. The adjuster may be formed as part of the lamp housing or may be a separate part that communicates with both the reflector and the lamp housing. One known type of adjuster comprises a body or main portion and a control rod extending therefrom. The body is engaged to the lamp housing. The body may be a separate part than the lamp housing and comprise an independent housing. Alternatively, the body may be part of the lamp housing and comprise an adjuster portion. The control rod is engaged to the reflector. Actuation or operation of the adjuster causes the control rod to longitudinally move with respect to the body of the adjuster. Such movement causes the reflector to pivot with respect to the lamp housing, thereby affecting the aim of the lamp.

One form of this type of adjuster is operated by an input shaft or driver such as a TORX®, flathead, or Philips® driver inserted into the adjuster. The body, the housing or the adjuster portion, of the adjuster has a mating input shaft, a gear, and a control rod positioned therein. The gear is functionally engaged to the control rod. An input shaft is inserted into the mating input shaft and interacts with the gear. Actuation of the input shaft results in rotation of the gear and movement of the engaged control rod. The gear translates actuation of the driver into movement of the control rod and adjustment of the aim of the lamp. Numerous variations of this concept exist.

In one variation of this concept, the gear is engaged to the control rod such that rotation of the gear causes the control rod to rotate. The control rod is threaded into the reflector or a grommet attached to the reflector. Therefore, rotation of the control rod causes the pivotally mounted reflector to move with respect to the adjuster and the lamp housing.

In another variation of this concept, the control rod does not rotate with respect to the adjuster. Instead, rotation of the gear about the control rod causes the control rod to move longitudinally with respect to the adjuster housing. This linear movement operates to push and pull the reflector, depending on the direction the gear is rotated. Currently, structures are provided inside the adjuster housing to prevent rotation of the control rod and to transfer rotation of the gear into linear movement of the control rod. For example, U.S. Pat. No. 5,079,676 to Lisak and U.S. Pat. No. 5,775,795 to Christian et al. disclose an adjuster having a control rod extending through a aperture in an adjuster housing. The control rod and aperture are shaped such that the aperture prevents the control rod from rotating therein. U.S. Pat. No. 5,707,133 discloses an anti-rotation insert seated within the housing. The control rod is inserted through the insert. The insert functionally engages the control rod and the housing such that the insert prevents the control rod from rotating therein. The adjusters disclosed in these patents typically have a large number of parts, are relatively expensive to manufacture and assemble, and require a large amount of torque to actuate Accordingly, a need exists for an improved adjuster and adjuster assembly that solves these and other deficiencies in the prior art. Of course, the present invention may be used in a multitude of situations where similar performance capabilities are required.

SUMMARY OF THE INVENTION

The present invention provides an adjuster and bracket assembly that is cost-effective, has relatively few parts, requires a low amount of torque to actuate, and overcomes certain of the deficiencies in the prior art.

In one embodiment, the adjuster of the present invention comprises a housing, a gear, a control rod, and at least one tang. The gear is positioned inside the housing. The control rod is functionally engaged by the gear and extends from the housing. At least one tang is positioned outside the housing so that the tang functionally engages the control rod. The tang prevents the control rod from rotating. Therefore, rotation of the gear results in non-rotational linear movement of the control rod. In one embodiment, the tang has at least one projection and the control rod has at least one groove corresponding to the projection. The projection of the tang functionally engages the groove, thereby preventing rotation of the control rod. The housing may have a mating input shaft into which an input shaft is inserted. The input shaft engages the gear such that actuation of the input shaft results in rotation of the gear and movement of the control rod. The input shaft may be permanently installed in the housing or may be a removable driver tool. In one embodiment, a portion of the control rod is positioned inside the gear and the gear and the portion of the control rod positioned therein are counter-threaded.

In one embodiment, the housing has an extended nose. The tang is positioned on the nose outside the housing. Further, the gear may have an extension that extends into the nose of the housing. A portion of the control rod is positioned inside the extension and the extension and the portion of the control rod positioned therein are counter-threaded. In one embodiment, the housing has an opening, the control rod is positioned inside the opening, and at least one tang is positioned around the opening outside of the housing.

In one embodiment, the adjuster is engaged to a lamp assembly. The lamp assembly has a reflector moveably mounted to the lamp housing. The housing of the adjuster is engaged to the lamp housing and the control rod is engaged to the reflector of the lamp. Actuation of the adjuster results in movement of the control rod and thus movement of the reflector.

In one embodiment of the present invention, the adjuster assembly includes a lamp housing, a gear, a control rod, and at least one tang. The lamp housing has an adjuster portion. The gear is positioned inside the adjuster portion. The control rod is functionally engaged by the gear and extends from the adjuster portion. At least one tang is positioned on the adjuster portion, outside the adjuster portion, so that the tang functionally engages the control rod and prevents rotation thereof. Rotation of the gear results in non-rotational linear movement of the control rod. In one embodiment, at least one tang has at least one projection and the control rod has at least one groove corresponding to the projection. The projection functionally engages the groove, thereby preventing rotation of the control rod. In one embodiment, a reflector is functionally engaged to the lamp housing and the control rod such that movement of the control rod causes the reflector to move with respect to the lamp housing. As with the adjuster housing, the adjuster portion of the lamp housing may have a mating input shaft and a nose. The tang may be positioned on the nose, outside the housing. The gear may have an extension that extends into the nose of the housing. Further, the gear and control rod may be counter-threaded.

While one possible application of the present invention is in connection with a vehicle lamp, many other applications are possible and references to use in connection with a vehicle lamp should not be deemed to limit the uses of the present invention. The terms "lamp," "input shaft," "control rod," "tang," "housing," or "reflector" as used herein should not be interpreted as being limited to specific forms, shapes, or compositions of a lamp, input shaft, control rod, tang, housing, or reflector. Rather, the lamp, input shaft, control rod, tang, housing, and reflector may have a wide variety of shapes and forms and may be composed of a wide variety of materials. These and other objects and advantages of the present invention will become apparent from the detailed description, claims, and accompanying drawings.

DETAILED DESCRIPTION OF THE PREFERRED EMBODIMENTS

Illustrative embodiments of an adjuster (identified generally as 30) in accordance with the present invention are shown in FIGS. 1 through 15. While the invention may be susceptible to embodiment in different forms, there are shown in the drawings, and herein are described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

FIGS. 1–11 show certain embodiments of an adjuster (identified generally as 30) in accordance with the present invention. The adjuster 30 includes a housing 32, a gear 38 and a control rod 44. The control rod 44 is functionally engaged by the gear 38. Preferably, as shown in exploded view in FIG. 3, the control rod 44 is positioned inside the gear 38. The gear 38 is positioned inside the housing 32. The housing 32 has at least one anti-rotational tang 42 positioned thereon. The tang 42 functionally engages the control rod 44 thereby preventing the control rod 44 from rotating. Actuation of the adjuster 30 results in rotation of the gear 38. Rotational movement of the gear 38 is translated into linear movement of the control rod 44 by rotation of the gear 38 about the control rod 44 and the threaded engagement of the two parts. In one embodiment shown in FIG. 3, the housing 32 has a mating input shaft 34. An input shaft 36 is inserted into a mating input shaft 34 and functionally engages the gear 38. The adjuster 30 is actuated by rotating the input shaft 36. Actuation of the driver 36 causes the gear to rotate and the control rod 44 to move.

Figure 1:
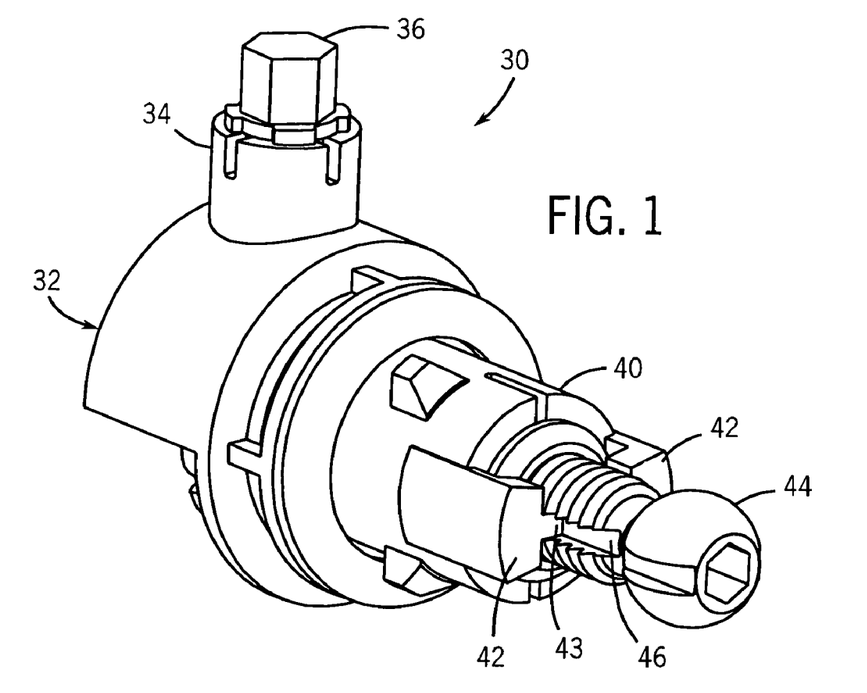
FIG. 1 is a front perspective view of one embodiment of an adjuster assembly in accordance with one embodiment of the present invention.
Figure 2:
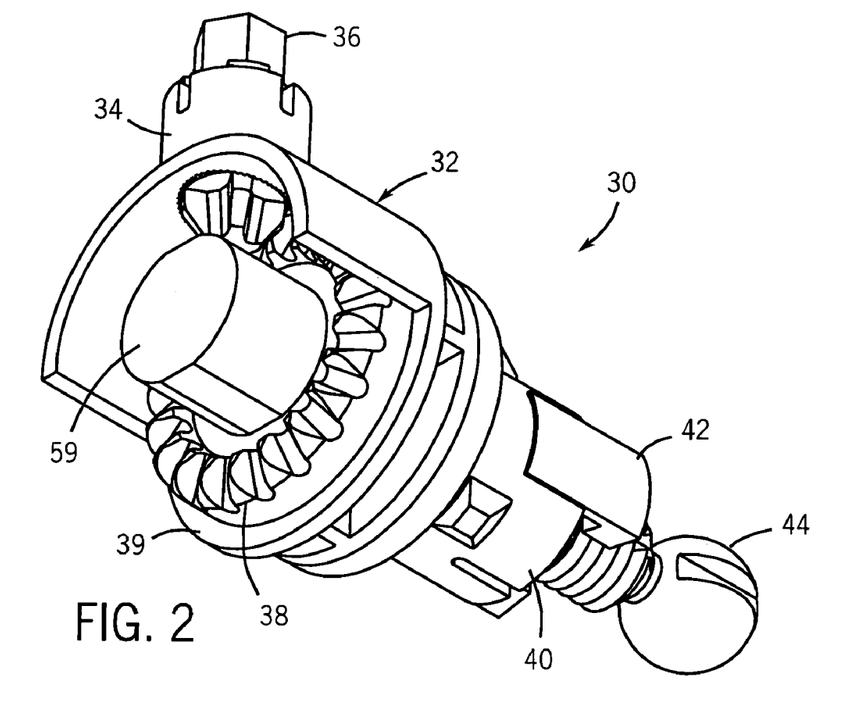
FIG. 2 is a rear perspective view of the adjuster assembly of FIG. 1.
Figure 3:
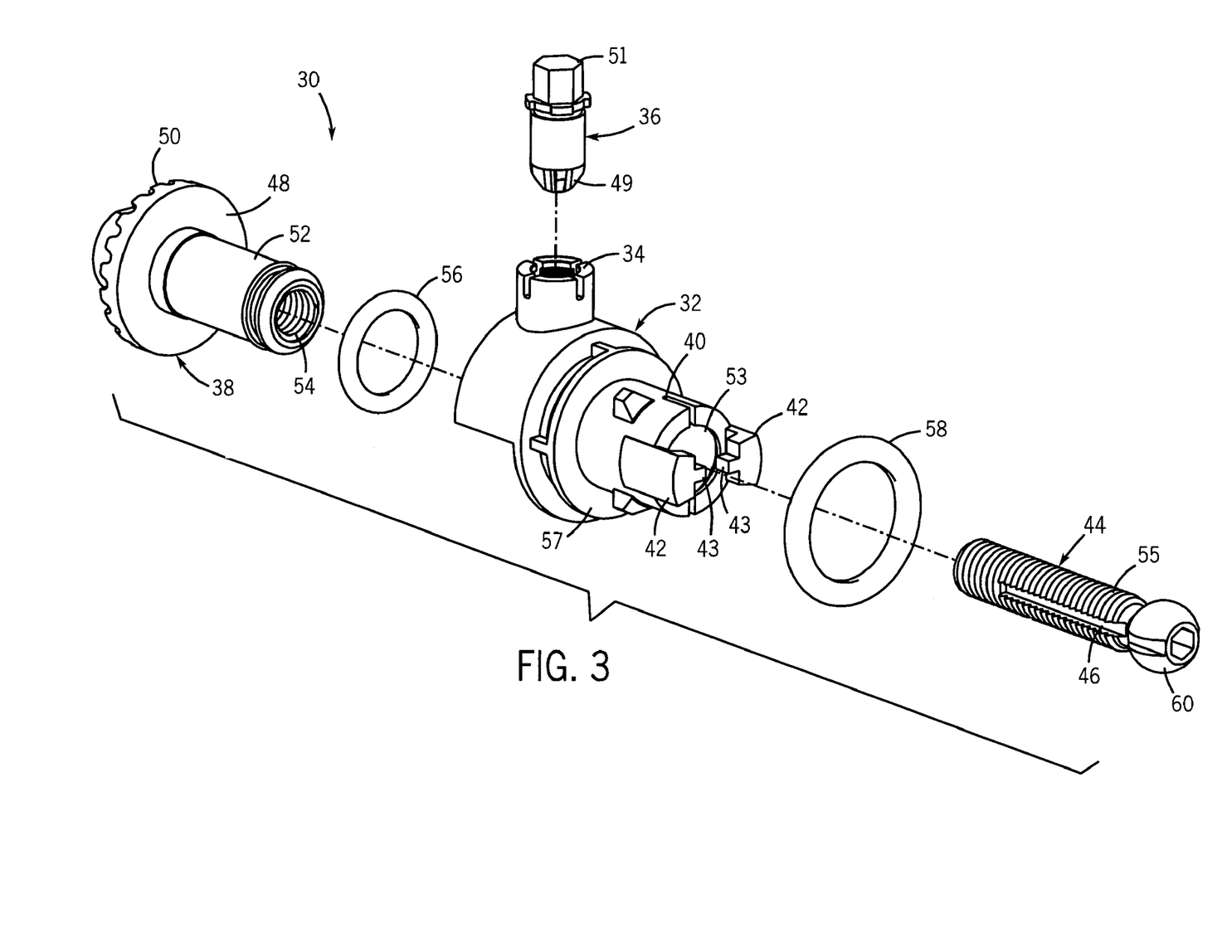
FIG. 3 is an exploded perspective view of the adjuster assembly of FIG. 1.

As shown in FIGS. 1, 2, 3, and 7, the housing 32 has a central opening 53, an internal shoulder 39 surrounding the opening 53, a mating input shaft 34, a face 57, and a nose 40. As shown in FIG. 3, the gear 36 has an extension 52 and a head 48. At least one gear tooth 50, and preferably a plurality of gear teeth 50, is provided on the gear head 48. In one embodiment not shown in the figures, the gear teeth 50 are positioned on the gear head 48 so that the teeth 50 face the extension 52. In another embodiment shown in FIG. 3, the gear teeth 50 face away from the extension 52. Regardless of the orientation of the gear teeth 50, the gear 38 is positioned inside the housing 32. Preferably, the gear 52, and most preferably the extension 52, snap fits into the housing 32. Preferably, the extension 52 of the gear 36 is inserted into the opening 53. In one embodiment, the extension 52 extends the length of the nose 40. In one embodiment shown in FIGS. 2 and 3, the gear 36 fits into the housing 32 such that the gear head 48 contacts the internal shoulder 39 of the housing 32. Preferably as shown in FIG. 3, an O-ring 56 is positioned around the extension 52 and against the head 48 of the gear 32. Inserting the gear 38 into the housing 32 causes a facial seal around the O-ring 56 between the head 48 of the gear 38 and the internal shoulder 39 of the housing 32.

Figure 9:
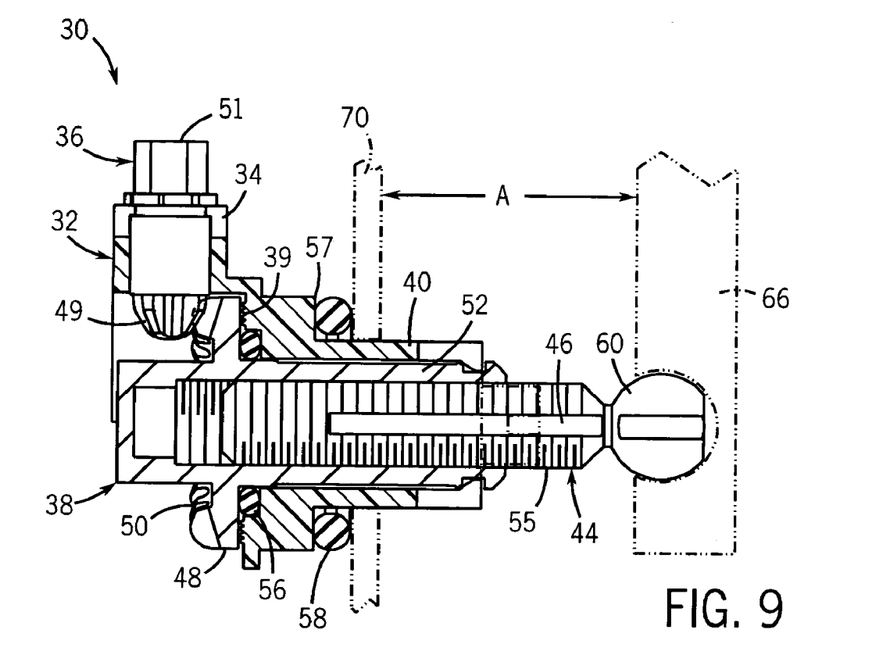
FIG. 9 is a partial cross sectional view of the adjuster assembly of FIG. 4 taken along the plane 9—9 in FIG. 4 with a lamp housing and reflector shown in phantom.
Figure 10:
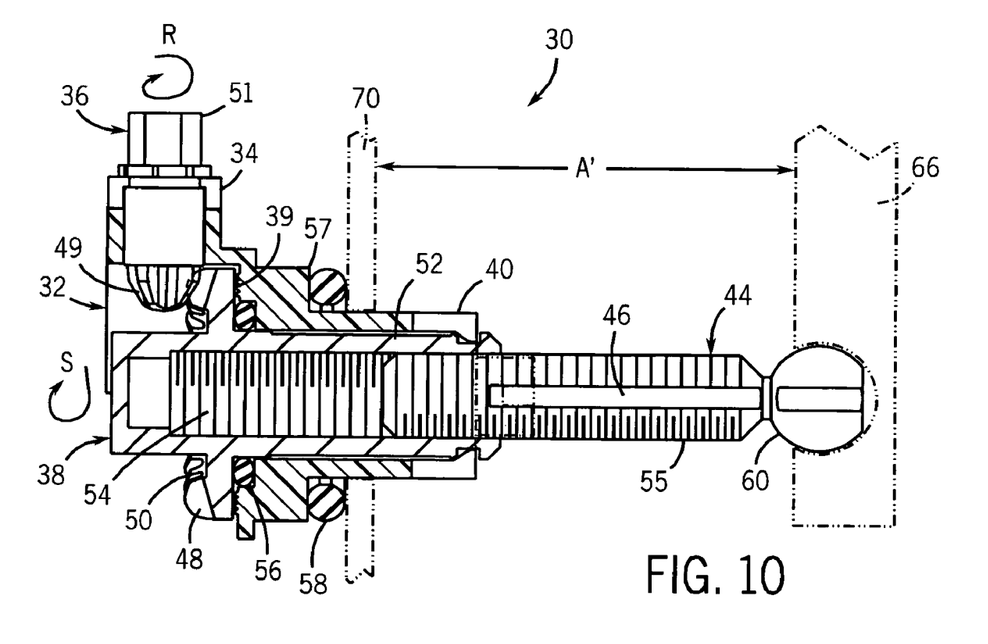
FIG. 10 is a partial cross sectional view of the adjuster assembly of FIG. 4 taken along the plane 9—9 in FIG. 4 with a lamp housing and lamp shown in phantom.

In the embodiment shown in FIGS. 3, 9, and 10, the housing 32 has a mating input shaft 34. An input shaft 36 is inserted into the mating input shaft 34. The input shaft 36 may be a flathead, Phillips head, Torx®, hexagonal head driver, or the like. In one embodiment, the input shaft 36 is a separate tool which is inserted into the mating input shaft 34. In another embodiment shown in FIG. 3, the input shaft 36 is an insert that is permanently fit into the mating input shaft 34. The head 51 of the input shaft 36 may be configured to be engaged by any standard tool, such as a wrench, flathead, Phillips head, Torx®, hexagonal head driver, or the like. Regardless of its configuration, the driver 36 has at least one tooth 49 configured to geometrically mate with the gear 38. Preferably, the input shaft 36 has a plurality of teeth 49 configured to mate with the gear teeth 50. Insertion of the input shaft 36 into the mating input shaft 34 causes the teeth 49 of the input shaft 36 to functionally engage the teeth 50 of the gear 38. Actuation of the input shaft 36 operates to rotate the gear 38, resulting in linear movement of the control rod 44. The input shaft 36 may be actuated by hand or by another tool or device.

As shown in FIG. 3, a control rod 44 is positioned in the opening 53 of the housing 32 and engaged to the gear 38. In the embodiment shown in FIGS. 2 and 5, the control rod 44 does not extend past the rear 59 of the gear 38. In this embodiment, the rear 59 of the gear 38 may be configured so that is may be functionally engaged by a tool, housing or other structure. In another embodiment, the control rod 44 extends past and through the rear of the gear 38 and may be engaged by a tool, housing, or other structure. The control rod 44 may be constructed of any material such as metal or plastic and by any method. In one embodiment, the control rod 4 is a ball stud. Preferably, the control rod 44 is inserted into the extension 52 of the gear 38. In the embodiment shown in FIG. 3, the interior 54 of the extension 52 and the shaft 55 of the control rod 44 are counter-threaded. Depending on the desired characteristics of the adjuster 30, the entire length of the control rod 44 may be threaded or only a portion may be threaded.

Figure 4:
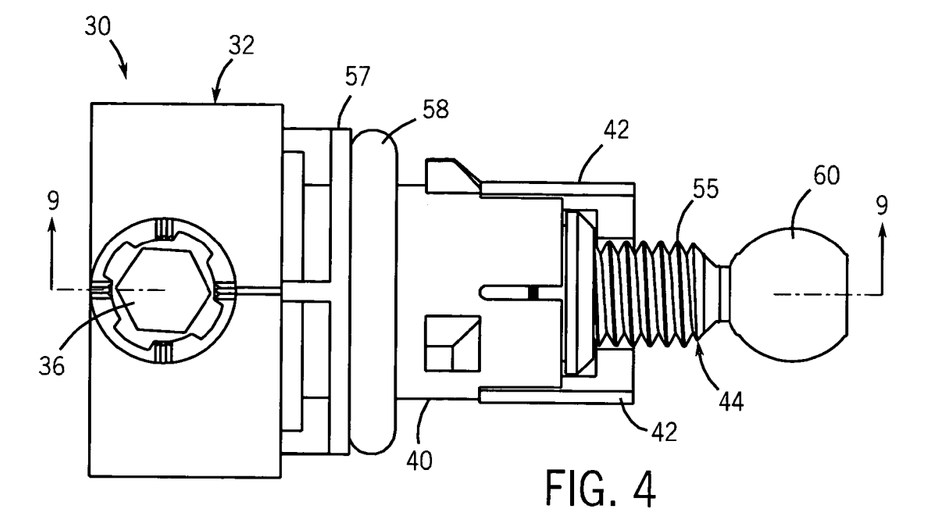
FIG. 4 is a top view of the adjuster assembly of FIG. 1.
Figures 5, 6:
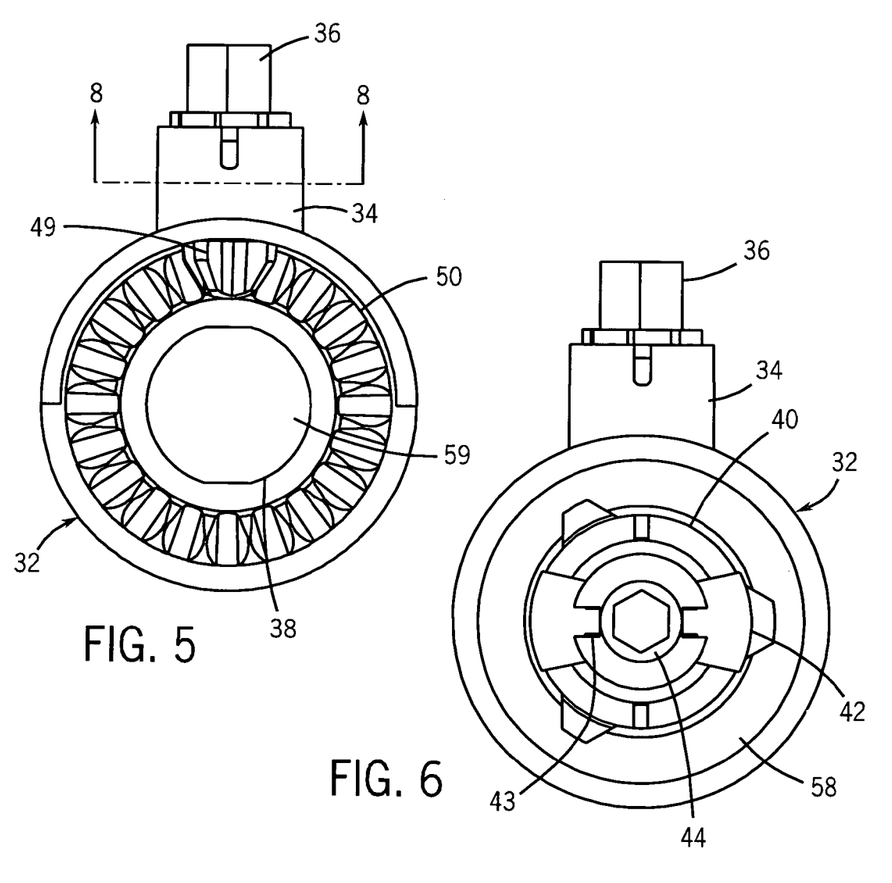
FIG. 5 is a rear view of the adjuster assembly of FIG. 1.
FIG. 6 is a front view of the adjuster assembly of FIG. 1.
Figure 7:
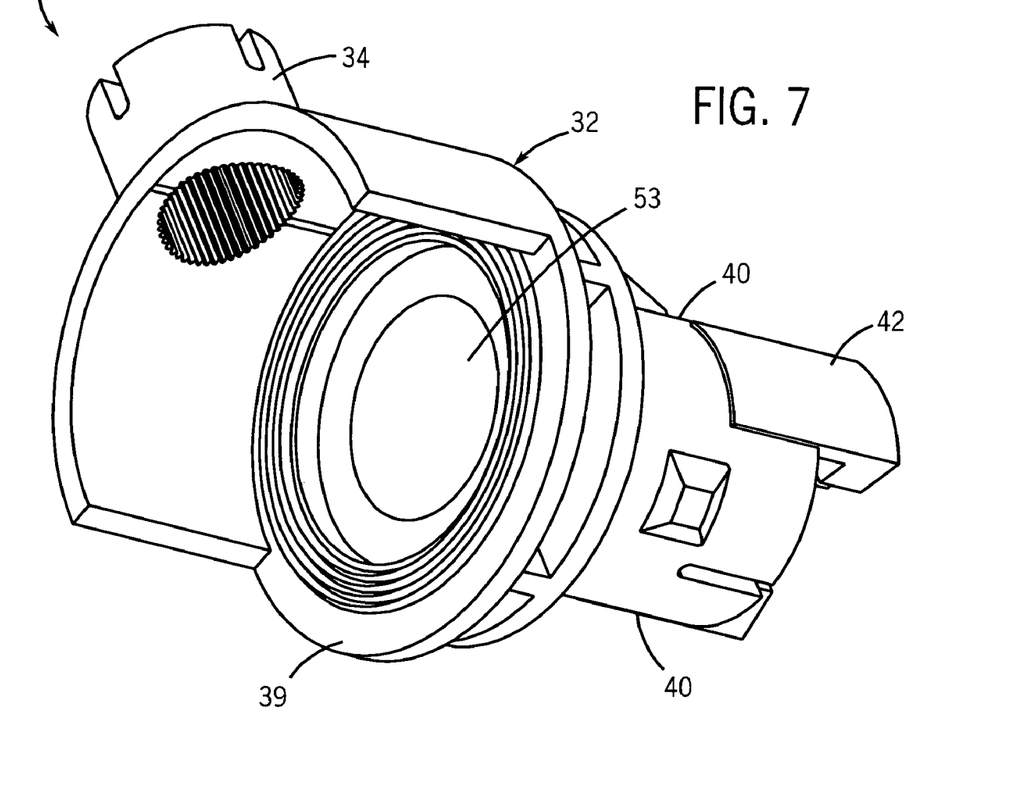
FIG. 7 is a perspective view of the housing of the adjuster assembly of FIG. 1.
Figure 8:
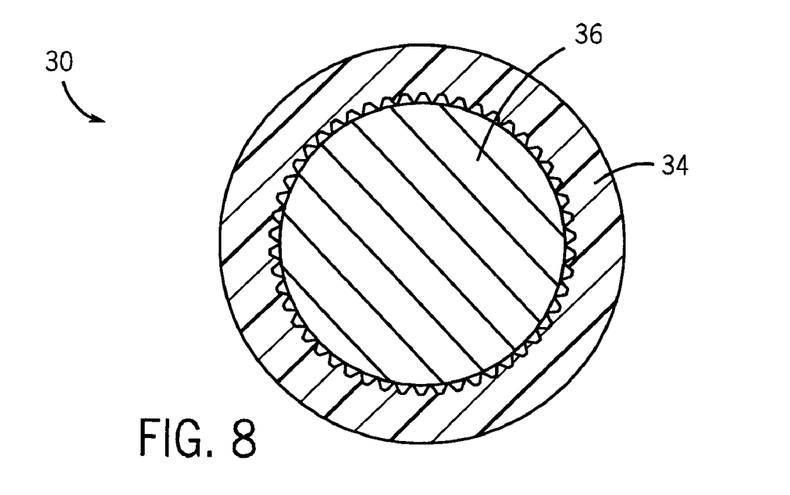
FIG. 8 is a cross sectional view of the adjuster assembly of FIG. 5 taken along the plane 8—8 in FIG. 5.
Figure 11:
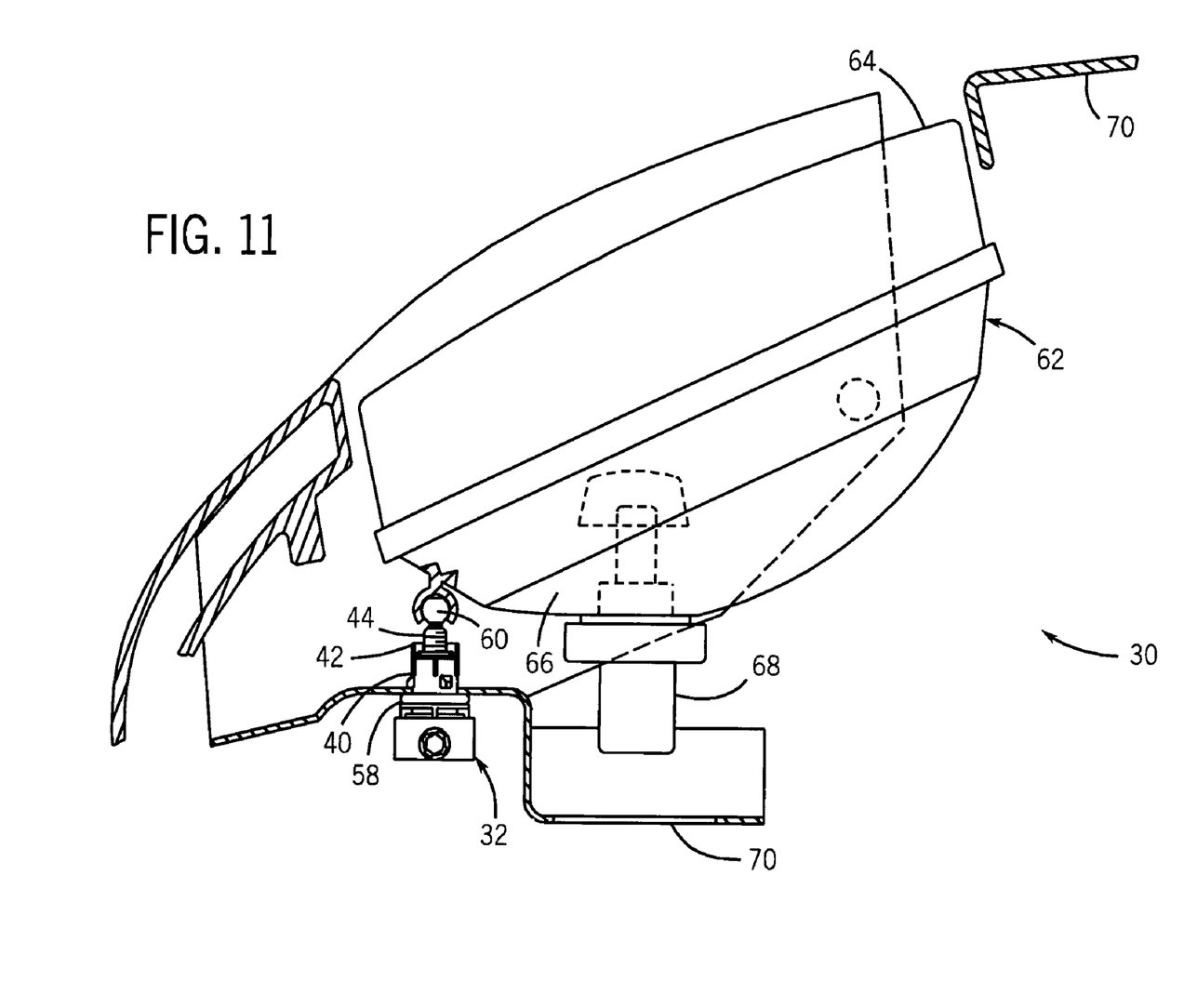
FIG. 11 is a partial cross sectional view of the adjuster assembly in accordance with one embodiment of the present invention, shown installed to a lamp housing and reflector.

As previously discussed, the control rod 44 is functionally engaged by at least one tang 42 extending from on the housing 32. Preferably, as shown in FIG. 4, the control rod 44 is engaged by two tangs 42. The tangs 42 are positioned outside the housing 32, preferably on the nose 40 of the housing. The tangs 42 may be formed as a portion of the nose 40 or may be constructed separately and attached to the housing 32 by any method such as welding, gluing, or melting. The tangs 42 operate to prevent the control rod 44 from rotating when the input shaft 36 is actuated and the gear 38 rotates. In the embodiment shown in FIG. 3, the tangs 42 each have a projection 43. In other embodiments, other numbers of tangs 42 and projections 43 may be used. The control rod 44 has at least one groove 46 corresponding to a projection 43 of the tang 42. Preferably, as shown in FIGS. 4 and 11, the adjuster 30 has two tangs 42 and the control rod 44 has two groves 46. The projection 43 functionally engages the groove 46 and prevents the control rod 44 from rotating. The groove 46 may be configured to accommodate and engage multiple projections 43 and/or multiple tangs 42.

In the embodiment shown in FIGS. 9 and 10, actuation of the input shaft 36 in direction R causes the gear to rotate in direction S. Rotation of the gear 38 in direction S causes the control rod 44 to extend from the housing 32. For example as shown in FIGS. 9 and 10, actuation of the input shaft 36 a certain amount causes the control rod 44 to move the reflector 66 from a distance A to a distance A' from the lamp housing 70. Actuation of the input shaft 36 in the opposite direction causes the control rod 44 to retract into the housing 32. Of course, these directions can be reversed or altered depending on the alignment of the teeth 49 of the input shaft 36, the teeth 30 of the gear 38, and the threading of the interior 54 of the gear 38 and the shaft 55 of the control rod 44.

In the embodiment shown in FIG. 11, the adjuster 30 is used to adjust the orientation of an entire lamp 62. The lamp 62, which includes a reflector 66, bulb 68 (rear of which shown), and lens 64, is mounted to a lamp housing 70. In this embodiment the adjuster 30 is functionally engaged to the lamp 62 and the lamp housing 70. The control rod 44 is engaged to the lamp 62. The control rod 44 may be engaged to any portion of the lamp 62. Preferably, the control rod 44 is engaged to the reflector 60. The control rod 44 may be engaged to the lamp 62 by any conventional method. For example in the embodiment shown in FIG. 11, the control rod 44 is a ball stud and the lamp 62 has a socket designed to engage the ball 44 on the end of the control rod 44. Alternatively, the lamp 62 may be fixed with only the reflector 60 pivoting within the lamp 60 upon movement of the control rod 44.

In the embodiment shown in FIG. 11, the housing 32 of the adjuster 30 is engaged to the lamp housing 70. The adjuster 30 may be engaged to the lamp housing 70 by any method. For example, in one embodiment, the adjuster 30 is snap fit into the lamp housing 70. In another embodiment shown in FIG. 11, the adjuster 30 engages the lamp housing 70 in the commonly used quarter-turn fashion. Regardless of the method of engagement, as shown in FIGS. 3, 9, 10, and 11, an O-ring 58 may be positioned on the nose 40 of the housing 32 of the adjuster 30. As shown in FIGS. 9 and 10, engagement of the adjuster 30 to the lamp housing 70 creates a facial seal between the lamp housing 70 and the O-ring 58 and the O-ring 58 and the face 57 of the housing 32 of the adjuster 30.

As discussed, actuation of the input shaft 36 causes the gear 38 to rotate. Rotation of the gear 38 is translated into linear movement of the control rod 44 (See FIGS. 9 and 10) by the gear 38 and the tang 42. Linear movement of the control rod 44 results in movement of the lamp 62 or pivoting of the reflector 66. Therefore, actuation of the adjuster 30 aims the lamp 62.

In another embodiment of the present invention shown in FIGS. 12–15, the adjuster 30 is integrated into the lamp housing 70. Specifically, the lamp housing 70 has an adjuster portion 72. The adjuster portion 72 may be a separate piece from the lamp housing 70 that is securely fixed to the lamp housing 70 by any conventional method such as welding, glue, or melting. In the embodiment shown in FIG. 14, the adjuster portion 72 and lamp housing 70 are constructed of a single piece of plastic material. The adjuster portion 72 is designed to function in much the same way as the housing 32 of the adjuster 30 described above and shown in FIGS. 1–11. As such, the adjuster portion 72 has a mating input shaft 74, an opening 76, an internal shoulder 78, and a nose 80. The adjuster portion 72 is designed so that the input shaft 36, the gear 38, and the control rod 44 may be inserted into the adjuster portion 72 in much the same way that they may be inserted into the housing 32. The same configurations of the input shaft 36, gear 38, and control rod 44 as described above may be used with the embodiments of the present invention comprising the adjuster portion 72.

Figures 12, 14:
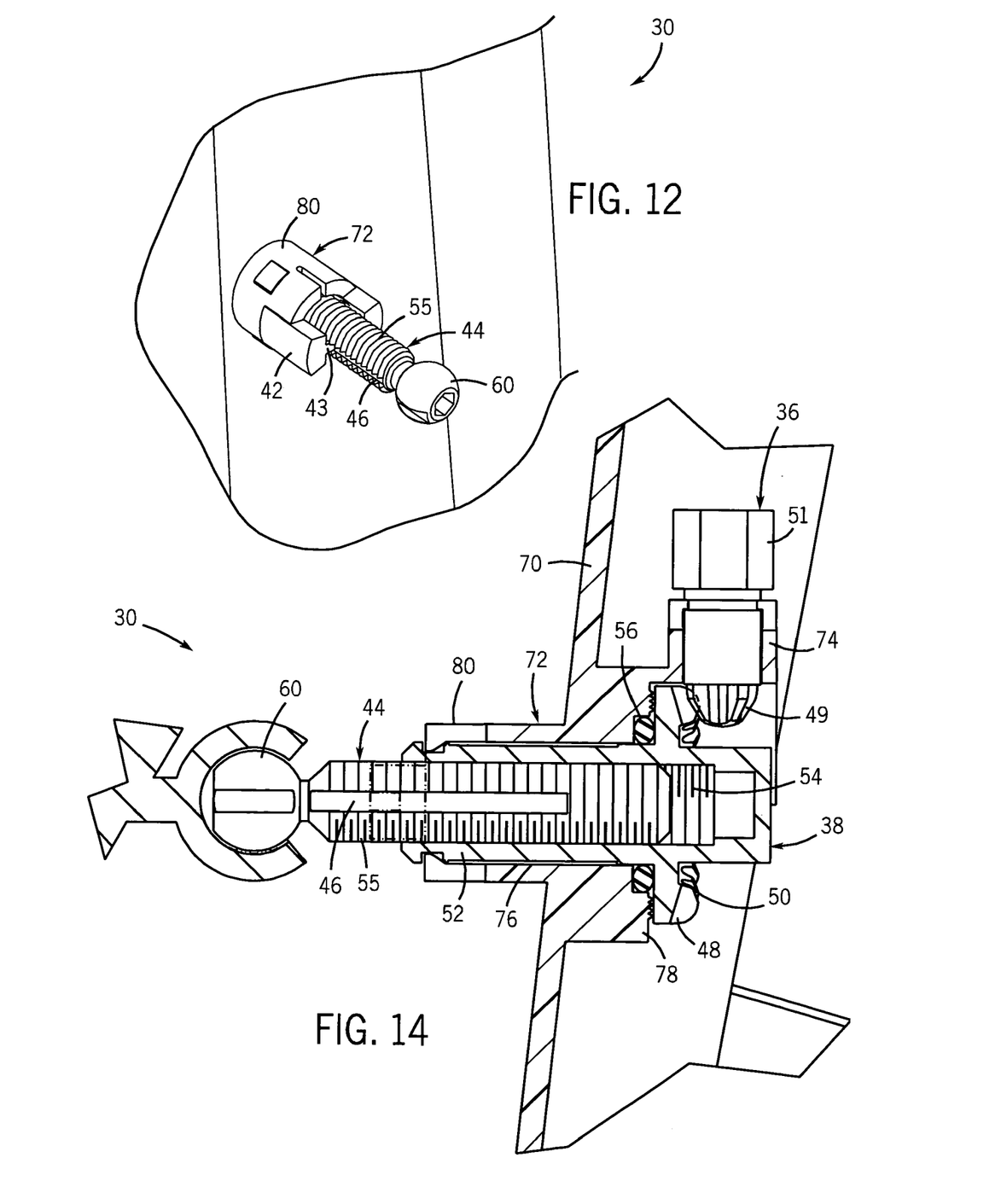
FIG. 12 is a front view of the adjuster assembly in accordance with one embodiment of the present invention, wherein the adjuster housing is formed as part of the lamp housing.
FIG. 14 is a partial cross sectional view of the adjuster assembly of FIG. 13 taken along the plane 14—14 in FIG. 13; and, FIG. 15 is a partial cross sectional view of the adjuster assembly in accordance with the embodiment of the present invention shown in FIGS. 12–14.
Figure 13:
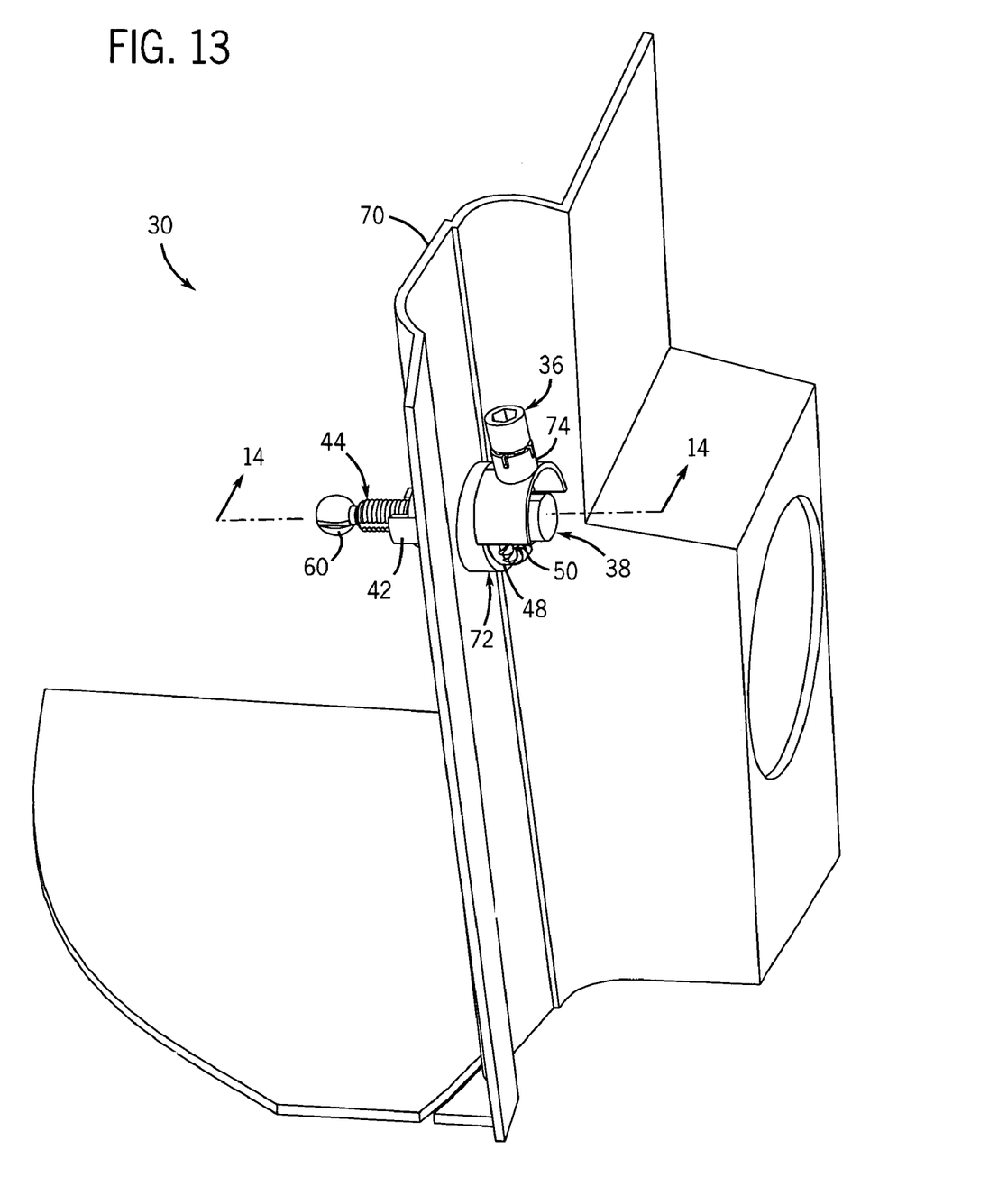
FIG. 13 is a perspective view of the adjuster assembly of FIG. 12.
Figure 15:
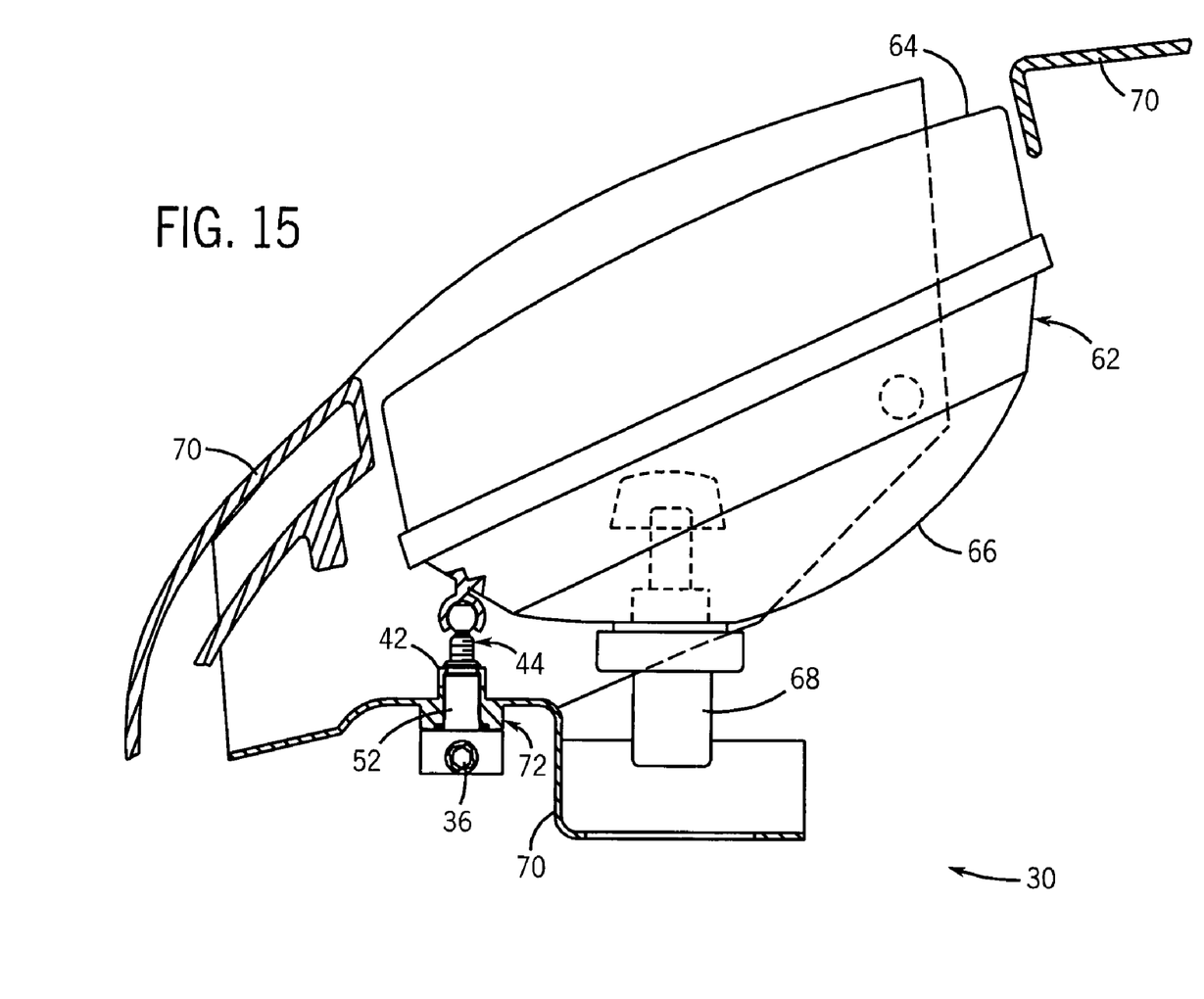

Similar to the embodiments described above and shown in FIGS. 1–11, at least one tang 42 is positioned on the nose 80 of the adjuster portion 72 (see FIGS. 12–15). As shown in FIG. 12, the tang 42 functionally engages the control rod 44 to prevent rotation thereof. As shown in FIG. 15, the control rod 44 is engaged to the lamp 62 and preferably to the reflector 66. Thus, as discussed above, actuation of the input shaft 36 causes the gear 38 to rotate. Rotation of the gear 38 is translated into linear movement of the control rod 44 by the gear 38 and the tang 42. Linear movement of the control rod 44 results in movement of the lamp 62, preferably pivoting of the reflector 66. Therefore, actuation of the adjuster 30 aims the lamp 62.

The adjuster of the present invention may have other applications aside from use in vehicle lamp assemblies and the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

I claim:

1. An adjuster comprising:
   a housing;
   a gear positioned at least partially inside the housing;
   a control rod functionally engaged by the gear and extending from the housing, the control rod having at least one groove; and,
   at least one tang positioned on and extending outside the housing so that the at least one tang functionally engages the at least one groove of the control rod and prevents rotation thereof such that rotation of the gear results in non-rotational linear movement of the control rod during operation of the adjuster.

2. The adjuster of claim 1 where the at least one tang has at least one projection.

3. The adjuster of claim 2 where the groove corresponds to the at least one projection such that the at least one projection functionally engages the groove thereby preventing rotation of the control rod.

4. The adjuster of claim 1 where the housing has a mating input shaft such that an input shaft inserted into the mating input shaft functionally engages the gear and actuation of the input shaft results in rotation of the gear and movement of the control rod.

5. The adjuster of claim 1 where the housing has a nose.

6. The adjuster of claim 5 where the at least one tang is positioned on the nose.

7. The adjuster of claim 5 where the gear has an extension that extends into the nose of the housing.

8. The adjuster of claim 7 where the control rod has a portion positioned inside the extension of the gear and the extension of the gear and the portion of the control rod positioned therein are counter-threaded.

9. The adjuster of claim 1 where the housing has an opening and the control rod is positioned in the opening.

10. The adjuster of claim 9 where the at least one tang is positioned outside the opening.

11. The adjuster of claim 1 where the gear has an interior, the control rod has a portion positioned inside the interior of the gear, and the interior of the gear and the portion of the control rod positioned therein are counter-threaded.

12. The adjuster of claim 1 further comprising:
    a lamp housing on which the housing is mounted; and,
    a reflector pivotably engaged to the lamp housing and the control rod such that movement
    of the control rod causes the reflector to move with respect to the lamp housing.

13. An adjuster assembly comprising:
    a lamp housing;
    a reflector pivotably positioned in the lamp housing; and,
    an adjuster comprising
      a housing;
      a gear positioned at least partially inside the housing;
      a control rod functionally engaged by the gear and extending from the housing, the control rod having at least one groove;
      at least one tang positioned on and extending outside the housing so that the at least one tang functionally engages the at least one groove of the control rod and prevents rotation thereof such that rotation of the gear results in non-rotational linear movement of the control rod; and
    where the adjuster is engaged to the lamp housing and the reflector such that during operation of the adjuster, the non-rotational linear movement of the control rod causes the reflector to move with respect to the lamp housing.

14. The adjuster assembly of claim 13 where the at least one tang has at least one projection corresponding to the at least one groove so that the at least one projection functionally engages the groove thereby preventing rotation of the control rod.

15. The adjuster assembly of claim 13 where the housing has a mating input shaft such that an input shaft inserted into the mating input shaft functionally engages the gear and actuation of the input shaft results in rotation of the gear, movement of the control rod and movement of the lamp.

16. The adjuster assembly of claim 13 where the lamp housing has a lens mounted thereto.

17. An adjuster assembly comprising:
    a lamp housing having an adjuster portion;
    a gear positioned at least partially inside the adjuster portion;
    a control rod functionally engaged by the gear and extending from the adjuster portion; and,
    at least one tang positioned on and extending outside a housing of the adjuster portion so that the at least one tang functionally engages at least one groove of the control rod and prevents rotation thereof such that rotation of the gear results in non-rotational linear movement of the control rod during operation of the adjuster.

18. The adjuster assembly of claim 17 further comprising a reflector pivotably mounted within the lamp housing and connected to the control rod such that movement of the control rod causes the reflector to move with respect to the lamp housing.

19. The adjuster assembly of claim 18 where the lamp housing has a lens mounted thereto.

20. The adjuster assembly of claim 17 where the at least one tang has at least one projection corresponding to the at least one groove so that the at least one projection functionally engages the groove thereby preventing rotation of the control rod.

21. The adjuster assembly of claim 17 where the adjuster portion of the lamp housing has a mating input shaft such that an input shaft inserted into the mating input shaft functionally engages the gear and actuation of the input shaft results in rotation of the gear and movement of the control rod.

22. The adjuster of claim 17 where the housing of the adjuster portion of the lamp housing has a nose.

23. The adjuster of claim 22 where the at least one tang is positioned on the nose.

24. The adjuster of claim 22 where the gear has an extension that extends into the nose.

25. The adjuster of claim 24 where the control rod has a portion that is positioned inside the extension of the gear and the portion of the control rod and the extension of the gear are counter-threaded.

26. The adjuster of claim 17 where the adjuster portion has an opening and the control rod is positioned in the opening.

27. The adjuster of claim 26 where the at least one tang is positioned outside the opening.

28. The adjuster of claim 17 where the gear has an interior, the control rod has a portion positioned inside the interior of the gear, and the interior of the gear and the portion of the control rod positioned therein are counter-threaded.

* * * * *